— | —
--- | ---
United States Patent [19] | [11] Patent Number: 4,973,614
Yoshino et al. | [45] Date of Patent: Nov. 27, 1990

[54] PROCESS FOR PRODUCING EMULSION POLYMER COMPOSITION

[75] Inventors: Fumio Yoshino, Izumi-ohtsu; Yoshiki Hasegawa, Osaka; Shinichi Yoshioka, Izumi-ohtsu, all of Japan

[73] Assignee: Dainippon Ink and Chemicals, Inc., Tokyo, Japan

[21] Appl. No.: 242,162

[22] Filed: Sep. 9, 1988

[51] Int. Cl.$^5$ .................... C08F 265/02; C08F 283/10
[52] U.S. Cl. ..................................................... 523/407
[58] Field of Search ........................................ 523/407

[56] References Cited

U.S. PATENT DOCUMENTS 4,285,847 8/1981 Ting ..................................... 525/63
4,446,258 5/1984 Chu ..................................... 523/407

FOREIGN PATENT DOCUMENTS 2207910 8/1973 Fed. Rep. of Germany .

*Primary Examiner*—C. Warren Ivy
*Attorney, Agent, or Firm*—Sherman and Shalloway

[57] ABSTRACT

A process for producing an emulsion polymer composition which comprises (a) emulsion-polymerizing an ethylenically unsaturated monomer containing no amino group in the molecule in the presence of a water-insoluble epoxy resin to form an emulsion polymer as seed particles, and then (b) emulsion-polymerizing an ethylenically unsaturated monomer containing an amino group in the molecule and another ethylenically unsaturated monomer copolymerizable with it in the presence of the emulsion polymer formed in step (a); in which (1) the weight ratio of the ethylenically unsaturated monomer to the epoxy resin in step (a) is from 100:100 to 100:5,
(2) the weight ratio of the amino group-containing ethylenically unsaturated monomer to the other ethylenically unsaturated monomer in step (b) is from 1:99 to 25:75,
(3) the ethylenically unsaturated monomer in step (a) and/or (b) contains 1 to 10% by weight of an ethylenically unsaturated carboxylic acid,
(4) the weight ratio of the ethylenically unsaturated monomer in step (a) to the ethylenically unsaturated monomer in step (b) is from 10:90 to 90:10, and
the weight ratio of the epoxy resin to the entire ethylenically unsaturated monomers is from 2:100 to 50:100.

8 Claims, No Drawings

PROCESS FOR PRODUCING EMULSION POLYMER COMPOSITION

This invention relates to a new and useful process for producing an emulsion polymer composition.

More specifically, this invention relates to an improved process for producing an emulsion polymer composition comprising a step of forming a seed emulsion polymer from an ethylenically unsaturated monomer and a water-insoluble epoxy resin used in a specific weight ratio, and a step of emulsion-polymerizing an amino group-containing ethylenically unsaturated monomer and another ethylenically unsaturated monomer copolymerizable with it used in a specific weight ratio in the presence of the seed emulsion polymer. The emulsion polymer composition has superior stability and self-curability even at low temperatures such as room temperature and is useful in a wide range of applications, for example as paints, paper treating agents, textile treating agents, adhesives and cement admixtures.

Various emulsion polymers are now used in a wide range of applications, and it is frequently the practice to cure the polymers in order to prove their properties. It is desired to provide emulsion polymers which cure at low temperatures and have superior stability in view of demand for saving of energy. One known means of meeting this desire is to cure a carboxylated emulsion polymer by mixing it with an emulsion of an epoxy resin or a water-soluble epoxy resin. It is thus well known that the glycidyl groups of the epoxy resin crosslinkingly react with the carboxyl groups of the carboxylated polymer in the presence of an organic amino compound as a promoter.

It is also known that amino group-containing emulsion polymers may also be reacted crosslinkingly with epoxy resins.

The above curing method using a combination of an emulsion of an epoxy resin or a water-soluble epoxy resin and a carboxylated emulsion polymer or an amino group-containing emulsion polymer is not entirely satisfactory because the resulting blend has only limited stability and a short pot life. Accordingly, such emulsion polymers are generally used in a two-package type by adding and mixing the epoxy resin and/or a curing promoter just prior to use. The operability of the two-package type, however, is inferior.

When the emulsion of the epoxy resin is used, the epoxy resin and the carboxylated or amino group-containing polymer form separate particles. Curing of the polymer may sometimes not be effected fully because of the influence of, for example, the emulsifier layer adsorbing on the surface of the particles and stabilizing the dispersed particles. On the other hand, when the water-soluble epoxy resin is used, this problem can be obviated. But the stability of the composition is reduced, and its pot life becomes short. Thus, handling of the resulting composition is unsatisfactory.

A relatively stable composition may be obtained from the epoxy resin and the carboxylated emulsion polymer by, for example, controlling the pH of the system, if a curing promoter is not added. However, it is considerably difficult to cure the composition at low temperature, and a heat-treatment at a temperature of at least 100° C. is usually necessary.

It is an object of this invention to remove the defects of the prior art described above, and to provide a process for producing an emulsion polymer composition which can be used as a one-package composition and can give a good cured film even at low temperatures such as room temperature.

According to this invention, the above object is achieved by a process for producing an emulsion polymer composition which comprises (a) emulsion-polymerizing an ethylenically unsaturated monomer containing no amino group in the molecule in the presence of a water-insoluble epoxy resin to form an emulsion polymer as seed particles, and then (b) emulsion-polymerizing an ethylenically unsaturated monomer containing an amino group in the molecule and another ethylenically unsaturated monomer copolymerizable with it in the presence of the emulsion polymer formed in step (a); in which (1) the weight ratio of the ethylenically unsaturated monomer to the epoxy resin in step (a) is from 100:100 to 100:5,
(2) the weight ratio of the amino group-containing ethylenically unsaturated monomer to the other ethylenically unsaturated monomer in step (b) is from 1:99 to 25:75,
(3) the ethylenically unsaturated monomer in step (a) and/or (b) contains 1 to 10% by weight of an ethylenically unsaturated carboxylic acid,
(4) the weight ratio of the ethylenically unsaturated monomer in step (a) to the ethylenically unsaturated monomer in step (b) is from 10:90 to 90:10, and
the weight ratio of the epoxy resin to the entire ethylenically unsaturated monomers is from 2:100 to 50:100.

The emulsion polymer composition obtained by the process of this invention is characterized by the fact that each of the fine emulsion particles consists of, in a layer structure, a portion containing the water-insoluble epoxy resin which is a curing agent and a portion containing the amino group-containing ethylenically unsaturated monomer which is a curing promoter as constituent units. This layer structure provides an emulsion polymer which can be used as a one-package composition and is stable.

The invention will now be described in detail.

The emulsion polymer containing the water-insoluble epoxy resin, which is used as seed particles in the process of this invention can be easily obtained by dissolving the water-insoluble epoxy resin in the ethylenically unsaturated monomer used in the emulsion polymer, and then emulsion-polymerizing the monomer by a known method. Alternatively, it may be obtained by dispersing the water-insoluble epoxy resin in an aqueous phase containing an emulsifier, and then emulsion-polymerizing the ethylenically unsaturated monomer while adding it to the dispersion of the epoxy resin.

The weight ratio of the ethylenically unsaturated monomer to the water-insoluble epoxy resin is from 100:100 to 100:5. If the epoxy resin is used in a proportion larger than the weight ratio specified, the amount of the epoxy resin which is not taken into the emulsion polymer particles increases and the stability of the resulting emulsion polymer is reduced. Furthermore, an increased amount of a coagulum forms in the emulsion polymer. On the other hand, if the weight ratio of the epoxy resin falls below the specified limit, the epoxy resin content in the final composition naturally becomes low, and a sufficient curing effect cannot be obtained.

It is essential in the process of this invention to use an ethylenically unsaturated carboxylic acid as part (1 to 10% by weight) of the ethylenically unsaturated monomer. The ethylenically unsaturated carboxylic acid may be used in step (a) of producing seed particles, or in step (b) of seed emulsion polymerization, or in both steps.

As the water-insoluble epoxy resin, the reaction product between bisphenol A and epichlorohydrin typified by a diglycidyl ether of bisphenol A" as a main commercially available type is most useful. It may, however, be any of a class of epoxy resins which have at least two glycidyl groups, and are insoluble or sparingly soluble in water and soluble in any of the ethylenically unsaturated monomers. Aliphatic epoxy resins and epoxidized urethane resins are also useful as the epoxy resin.

Epoxy resins having high water-solubility or hydrophilicity cannot be used in this invention because they are not easily taken into the emulsion polymer particles and are prone to exist in the aqueous phase or on the surfaces of the polymer particles.

Examples of the amino group-containing ethylenically unsaturated monomer used as an essential component in seed emulsion polymerization include alkylamino esters of acrylic or methacrylic acid such as N-methylaminoethyl acrylate, N-methylaminoethyl methacrylate, dimethylaminoethyl acrylate and dimethylaminoethyl methacrylate; monovinylpyridines such as vinylpyridine; alkylamino group-containing vinyl ethers such as dimethylaminoethyl vinyl ether; and unsaturated amides having an alkylamino group such as N-(2-dimethylaminoethyl)acrylamide or methacrylamide. Of these, dimethylaminoethyl acrylate and dimethylaminoethyl methacrylate are useful for copolymerization with the other ethylenically unsaturated monomer.

The amino group-containing ethylenically unsaturated monomer is used in a proportion of 1 to 25% by weight in the ethylenically unsaturated monomer used in seed emulsion polymerization. If it is used in a smaller amount than the specified limit, its action as a curing promoter and a crosslinking site is insufficient. If its amount is larger than the specified limit, the resulting copolymer has high hydrophilicity since the amino group-containing etylenically unsaturated monomer has strong hydrophilicity. This leads to the defect that a film of the resulting emulsion polymer has reduced water resistance.

In the practice of the process of this invention, the ethylenically unsaturated monomer used in step (a) and/or step (b) should essentially contain an ethylenically unsaturated carboxylic acid, for example, an ethylenically unsaturated monobasic carboxylic acid such as acrylic, methacrylic or crotonic acid, or an ethylenically unsaturated dibasic carboxylic acid such as itaconic, maleic or fumaric acid. Monoalkyl esters of the ethylenically unsaturated dibasic carboxylic acids may of course be used as the ethylenically unsaturated monobasic carboxylic acids.

Use of these ethylenically unsaturated carboxylic acids provides a curing promoter for epoxy resins and a crosslinking site, and is also effective for improving the mechanical stability of emulsion polymers as is well known in the art. The amount of the ethylenically unsaturated carboxylic acid used should not be in an equivalent relation to the reactive groups of the epoxy resins. It should however be 1 to 10% by weight based on the entire ethylenically unsaturated monomers used in the emulsion polymerization step (a) and the seed emulsion polymerization step (b). If it is less than the specified limit, a good crosslinking effect cannot be obtained. If, on the other hand, it exceeds the upper limit specified, a film formed from the resulting emulsion polymer has reduced resistance to water and alkalies. The ethylenically unsaturated carboxylic acid is used in the emulsion polymerization step (a), or the seed emulsion polymerization step (b), or in both.

Examples of the other ethylenically unsaturated monomers used in this invention include acrylic esters such as methyl acrylate, ethyl acrylate and butyl acrylate; methacrylic esters such as methyl methacrylate and ethyl methacrylate; maleic, fumaric and itaconic esters; vinyl esters such as vinyl acetate, vinyl propionate and vinyl esters of tertiary carboxylic acids; aromatic vinyl compounds such as styrene and vinyltoluene; heterocyclic vinyl compounds such as vinylpyrrolidone; vinyl compounds such as vinyl chloride, acrylonitrile, vinyl ether, vinyl ketone and vinylamide; vinylidene halides such as vinylidene chloride and vinylidene fluoride; alpha-olefins such as ethylene and propylene; and dienes such as butadiene. If desired, there may also be used alpha,beta-ethylenically unsaturated acids such as acrylamide, methacrylamide and maleinamide; substituted amides of unsaturated carboxylic acids, such as N-methylolacrylamide, N-methylolmethacrylamide and diacetone acrylamide; and monomers containing two or more unsaturated bonds per molecule such as diallyl phthalate, divinylbenzene, allyl acrylate and trimethylolpropane trimethacrylate. Compounds having both an unsaturated group and a sulfonic acid or sulfate group, and alkali salts thereof, such as vinylsulfonic acid, styrenesulfonic acid and allyl alkyl itaconate sulfate may also be used.

The method of emulsion polymerization in the process of this invention will now be described in detail.

The emulsion polymer containing the water-insoluble epoxy resin which forms seed particles in this invention is firstly produced by a known emulsion polymerization method from an ethylenically unsaturated monomer mixture containing the epoxy resin dissolved in it, in water in the presence or absence of an emulsifier. It is also possible to emulsify the epoxy resin to an aqueous solution of an emulsifier, add the ethylenically unsaturated monomer and a radical generating initiator to the dispersion and emulsion-polymerize the monomer.

Another method, which is like the "soap-free emulsion polymerization method", comprises performing emulsion polymerization using a water-soluble polymer, above all a hydrophilic acrylic polymer, without using a class of emulsifiers called surfactants.

The emulsion polymer obtained is then added to an aqueous phase. The ethylenically unsaturated monomer mixture and a radical generating initiator are added, and emulsion polymerization is carried out in the presence of the seed emulsion polymer by a known method. To stabilize the polymerization system during the emulsion polymerization by, for example, preventing formation of a coagulum, an emulsifier may further be added in addition to the seed emulsion polymer.

The above seed emulsion polymerization is carried out by using separately prepared seed particles. It is also possible to produce the seed emulsion polymer and subsequently, in the same reaction apparatus, add the ethylenically unsaturated monomer mixture and the radical generating initiator to be used in the seed emulsion polymerization, and thus emulsion-polymerize the monomeric mixture. Specifically, the desired emulsion polymer composition can be obtained by emulsion-polymerizing the ethylenically unsaturated monomer mixture in the presence of the epoxy resin using the radical polymerization initiator in the aqueous phase containing the emulsifier or the conventional reactive emulsifier dissolved in it, then adding the ethylenically unsaturated monomer mixture and the radical initiator, and subjecting the mixture to seed emulsion polymerization.

The amount of the water-insoluble epoxy resin used should be such that the weight ratio of the epoxy resin to the entire ethylenically unsaturated monomers used in steps (a) and (b) is from 2:100 to 50:100. If the ratio is less than 2:100, no sufficient curing effect can be obtained. If it exceeds 50:100, the stability of the resulting emulsion polymer is reduced or the unreacted epoxy resin remains. Consequently, a film obtained from the resulting emulsion polymer is excessively pliable.

The weight ratio of the ethylenically unsaturated monomer used in step (a) to the ethylenically unsaturated monomer used in step (b) should be from 10:90 to 90:10, preferably from 25:75 to 75:25. If the weight proportion of the monomer in step (a) is less than 10, the resulting emulsion polymer has reduced stability. On the other hand, if the weight proportion of the monomer in step (b) is less than 10, the resulting polymer has reduced curability.

Examples of the emulsifier used in the process of this invention include anionic emulsifiers such as sodium alkyl benzenesulfonates, sodium laurylsulfate, sodium dioctylsulfosuccinate and alkylphenyl polyoxyethylene sulfate, sodium or ammonium salts; polyoxyethylene alkyl phenyl ethers, polyoxyethylene alkyl ethers and polyoxyethylene/polyoxypropylene block copolymer. These emulsifiers are usually employed in emulsion polymerization. The amount of the emulsifier used is preferably 0.5 to 15% by weight based on the total weight of the water-insoluble epoxy resin and the ethylenically unsaturated monomer in step (a) for producing the emulsion polymer as seed particles. If the amount of the emulsifier is larger than the specified limit, the final emulsion polymer composition may have reduced water resistance. If it is less than the specified limit, the stability of the reaction mixture during emulsion polymerization and the stability of the resulting emulsion polymer might be reduced. Desirably, the amount of the additional emulsifier used in the seed emulsion polymerization step (b) is desirably not more than 10% based on the weight of the solids of the emulsion polymer as seed particles because the formation of new particles is reduced.

A water-soluble polymer may be used instead of the above emulsifier. Typical examples of the water-soluble polymer are acrylic polymers such as acrylic acid and methacrylic acid, maleinized polybutadiene, styrene/maleic acid copolymer, and vinylsulfonic acid polymer and sulfoethyl (meth)acrylate copolymer. They may be used singly or in combination, or further as a combination of the above-mentioned various emulsifiers.

The amount of the water-soluble polymer used should be the same as the amount of the emulsifier described above. When the emulsifier is used in combination with the water-soluble polymer, the total amount of these should be within the range defined with regard to the emulsifier.

The radical generating initiators used in the emulsion polymerization in this invention may be any of those which are used in ordinary emulsion polymerization. They may be, for example, potassium persulfate, ammonium persulfate, azobisisobutyronitrile and a hydrochloride thereof. Organic peroxides such as cumene hydroperoxide and tert-butyl hydroperoxide may be used as required. Known redox initiators composed of a combination of these persulfates or peroxides, a metal ion such as an iron ion and a reducing agent such as sodium sulfoxylate, formaldehyde, sodium pyrosulfate and L-ascorbic acid may also be used.

From a practical standpoint, the concentration of the monomer during emulsion polymerization should preferably be such that the final emulsion polymer composition has a solids concentration of 25 to 65% by weight. The ethylenically unsaturated monomers and the radical initiator may be fed to the reaction system at a time, continuously by dropping, or portionwise, or by any known method.

The emulsion polymerization is carried out at the same temperature as in known emulsion polymerization under atmospheric pressure. When a gaseous ethylenically unsaturated monomer is used, the emulsion polymerization is carried out under elevated pressures.

Various additives for ordinary emulsion polymers may be added to the emulsion polymer composition obtained by the process of this invention. Specifically, film-forming aids, plasticizers, organic solvents, defoamers, dispersing agents, surface-active agents, thickeners, pigments, fillters, antisptics, antifungal agents and pH adjusting agents may be added as required.

The following examples illustrate the present invention more specifically. It should be understood however that the invention is not limited to these examples. In these examples, all parts and percentages are by weight.

EXAMPLE 1 AND COMPARATIVE EXAMPLE 1

A 1.5-liter reaction vessel equipped with a stirrer, a reflux condenser, a dropping funnel and a thermometer was charged with the following materials, and they were dissolved.

| | |
|---|---|
| Deionized water | 324.0 parts |
| Polyoxyethylene nonylphenyl type nonionic emulsifier having an HLB of 17.2 with 30 moles of ethylene oxide added thereto (NE-1 for short) | 16.0 parts |
| Sodium dodecylbenzenesulfonate (AE-1 for short) | 4.0 parts |

Then, a mixture of the following compounds was put in a dropping funnel.

| | |
|---|---|
| "Epiclon 850" (a product of Dainippon Ink and Chemicals, Inc.; epoxy resin) | 40.0 parts |
| n-Butyl acrylate | 200.0 parts |
| Methyl methacrylate | 192.0 parts |
| Acrylic acid | 8.0 parts |

While nitrogen gas was fed into the reactor, the temperature of the inside of the reactor was elevated to 60° C. with stirring. Then, 40 parts of a 2% solution of potassium persulfate in deionized water was added, and then 20% of the epoxy resin-monomer mixture in the dropping funnel was added. The temperature rise by the heat of polymerization was controlled by a water bath, and while the inside of the reactor was maintained at 80° C., the remainder of the epoxy resin-monomer mixture and 80 parts of a 2% aqueous solution of potassium persulfate was added dropwise over 2 hours to perform polymerization. The reaction mixture was maintained further at 80° C. for 2 hours, cooled to room temperature, filtered through a 200-mesh cloth, and taken out to give an emulsion polymer as seed particles. This polymer had a non-volatile content of 50.3% and a pH of 2.8.

A similar 1.5-liter reactor was charged with 452 parts of the emulsion polymer obtained and 125 parts of water. Then, a mixture of the following ethylenically unsaturated monomers was prepared and put in a dropping funnel.

| Ethyl acrylate | 120.0 parts |
|---|---|
| Methyl methacrylate | 74.0 parts |
| Dimethylaminoethyl methacrylate | 4.0 parts |
| Acrylic acid | 2.0 parts |

While nitrogen gas was fed into the reactor, the temperature of the inside of the reactor was raised to 70° C. with stirring. Sixty parts of a 2% aqueous solution of potassium persulfate prepared in a separate dropping funnel and the above monomeric mixture were added dropwise to perform polymerization. The dropwise additions were carried out for 2 hours while maintaining the inside of the reactor at 70° C. The mixture was maintained at the same temperature for 2 hours, cooled at room temperature and filtered through a 200-mesh filter cloth to prepare an emulsion polymer composition. The composition had a non-volatile content of 50.2%, a pH of 5.9, and a viscosity [measured by a Brookfield rotary viscometer (to be referred to as the rotary viscometer) with a rotor No. 2 at a rotating speed of 60 rpm and a temperature of 25° C]of 120 cps.

The resulting composition was stored for one month at 50° C., either as such or after its pH was adjusted to 9.5 with aqueous ammonia. In either case, the composition showed no such change as flocculation and remained stable.

The composition before pH adjustment and the composition after pH adjustment were each coated on a glass plate by a 3-mil applicator, and dried at room temperature at about 25° C. for 48 hours. The surface of each of the coated films was rubbed with a cloth impregnated with toluene. After 50 rubbings, slight injury was observed on the surface, but the coated film was not dissolved out. In other words, the coated films showed good solvent resistance and the resulting coated film was in a perfectly cured state.

Separately, for comparison, the epoxy resin, the ethylenically unsaturated monomers used in forming seed particles, and the ethylenically unsaturated monomers used in seed polymerization were mixed in the same proportions as in Example 1, and subjected to emulsion polymerization under the same polymerization conditions as in the production of the seed particles in Example 1. The resulting emulsion polymer had a non-volatile content of 50.2%, a pH of 8 and a viscosity of 180 cps. The polymer samples were directly adjusted to pH 9.5, and subjected to storage test at 50° C. and to a toluene rubbing test in the same way as in Example 1. The coated films had good solvent resistance. But the polymers had poor stability. The polymer having a pH of 5.8 flocculated after storage for 2 weeks at 50° C., and the polymer having a pH of 9.5 flocculated after 3 days at 50° C.

EXAMPLE 2

The same reactor as used in Example 1 was charged with the following materials, and they were dissolved.

| Deionized water | 410.0 parts |
|---|---|
| NE-1 | 16.0 parts |
| Polyoxyethylene nonylphenyl ether-type nonionic emulsifier having an HLB of 12.0 with 9 moles of ethylene oxide added thereto (NE-2 for short) | 8.0 parts |
| Polyoxyethylene nonylphenyl ether ammonium sulfate-type anionic emulsuifier containing 6 moles of ethylene oxide added thereto (AE-2 for short) | 4.0 parts |

A mixture of the following epoxy resin and the monomers was prepared and put in a dropping funnel.

| "Epiclon 850" | 120.0 parts |
|---|---|
| 2-Ethylhexyl acrylate | 180.0 parts |
| Methyl methacrylate | 216.0 parts |
| Methacrylic acid | 4.0 parts |

The above materials were subjected to emulsion polymerization under the same reaction conditions as in Example 1 using a 2% aqueous solution of potassium persulfate as an initiator to give an emulsion polymer as seed particles. The resulting emulsion polymer had a non-volatile content of 50.7% and a pH of 3.0.

Then, as in Example 1, a mixture of the following monomers was emulsion-polymerized using 540 parts of the emulsion polymer and 131 parts of water.

| n-Butyl acrylate | 60.0 parts |
|---|---|
| Ethyl acrylate | 50.0 parts |
| Methyl methacrylate | 80.0 parts |
| Dimethylaminoethyl acrylate | 6.0 parts |
| Methacrylic acid | 4.0 parts |

As an initiator, 60 parts of a 2% aqueous solution of potassium sulfate was used. The resulting emulsion polymer was adjusted to pH 9.0 with aqueous ammonia, and then filtered to give an emulsion polymer composition. The composition had a non-volatile content of 50.5% and a viscosity of 160 cps. When the composition was stored for one month at 50° C., no such change as flocculation occurred, and it had good stability. A coated film of the composition on a glass plate obtained as in Example 1 showed good solvent resistance in the same toluene rubbing test as in Example 1.

EXAMPLE 3 AND COMPARATIVE EXAMPLE 2

The same reactor as in Example 1 was charged with the following materials, and they were dissolved.

| Deionized water | 332.0 parts |
|---|---|
| NE-1 | 16.0 parts |
| NE-2 | 4.0 parts |
| AE-2 | 2.0 parts |

While nitrogen gas was fed into the reactor, a mixture of the following epoxy resin and monomers was fed into the reactor with stirring.

| | |
|---|---|
| "Epichlon 1050" (epoxy resin produced by Dainippon Ink and Chemicals, Inc.) | 24.0 parts |
| n-Butyl acrylate | 50.0 parts |
| Methyl methacrylate | 47.0 parts |
| Methacrylic acid | 3.0 parts |

Then, the temperature of the inside of the reactor was adjusted to 30° C., and 0.5 part of a 1% aqueous solution of $FeCl_3.6H_2O$ was added. Furthermore, 50 parts of a 2% aqueous solution of ammonium sulfate and 50 parts of a 2% aqueous solution of sodium pyrosulfite were added. This initiated polymerization, and heat was generated. An emulsion polymer as seed particles formed. After the heat generation ceased, the polymer was left to stand for 1 hour, and the temperature of the inside of the reactor was maintained at 50° C. Then, a separately prepared monomeric mixture shown below, 50 parts of a 2% aqueous solution of ammonium persulfate and 50 parts of a 2% aqueous solution of sodium pyrosulfite were added dropwise over 2 hours.

| | |
|---|---|
| n-Butyl acrylate | 80.0 parts |
| Ethyl acrylate | 79.0 parts |
| Methy methacrylate | 129.0 parts |
| Dimethylaminoethyl methacrylate | 9.0 parts |
| Methacrylic acid | 3.0 parts |

The mixture was maintained further at 50° C. for 2 hours, cooled to room temperature, adjusted to pH 8.5 with aqueous ammonia, and filtered through a 200-mesh filter cloth to obtain an emulsion polymer composition. This composition had a non-volatile content of 45.3% and a viscosity of 100 cps, and showed good stability for one month at 50° C.

On the other hand, as Comparative Example 2, the same materials as above excepting the epoxy resin were emulsion-polymerized in the same way as in Example 3 to form an emulsion polymer. This polymer had a non-volatile content of 44.0% and a viscosity of 70 cps (measured by the rotary viscometer with rotor No. 1 at a rotating speed 60 rpm and a temperature of 25° C.). The pH of the polymer was then similarly adjusted to 8.5.

The composition of Example 3 and the composition of Comparative Example 2 not containing the epoxy resin were each coated on glass plates to form coated films as in Example 3. Then, the coated films were subjected to the same toluene rubbing test as in Example 1. The coated film from the composition of Example 3 was only slightly injured by the toluene rubbing, whereas the coated film from the composition of Comparative Example 2 was mostly dissolved and lost.

Coated films similarly prepared were immersed in water at 25° C. for 48 hours, and changes in their states were observed. The film from the composition of Example 3 was whitened and swollen only to a very slight degree and showed good water resistance. In contrast, the film from the composition of Comparative Example 2 was markedly whitened and swollen and showed inferior water resistance.

EXAMPLE 4

The same reactor as in Example 1 was charged with the following materials, and they were dissolved.

| | |
|---|---|
| Deionized water | 500.0 parts |
| NE-1 | 30.0 parts |
| AE-2 | 1.0 part |

While nitrogen gas was fed into the reactor, the temperature of the inside of the reactor was elevated to 60° C. with stirring. Then, a mixture of 100.0 parts of Epiclon 850 and 10.0 parts of NE-2 was gradually added over the course of 30 minutes. The mixture was stirred for 1 hour to disperse the epoxy resin. Subsequently, a mixture of the following monomers was added.

| | |
|---|---|
| n-Butyl acrylate | 50.0 parts |
| Styrene | 45.0 parts |
| Methacrylic acid | 5.0 parts |

After the addition of the above monomeric mixture, 25 parts of a 2% aqueous solution of potassium persulfate was added. While the temperature was maintained at 70° C. by heating or cooling, the mixture was maintained for 4 hours to react it.

Then, the following monomeric mixture and 50 parts of a 2% aqueous solution of potassium persulfate were added dropwise over 2 hours to polymerize the monomers.

| | |
|---|---|
| n-Butyl acrylate | 110.0 parts |
| Methyl methacrylate | 75.0 parts |
| Dimethylaminoethyl acrylate | 10.0 parts |
| Methacrylic acid | 5.0 parts |

Furthermore, the mixture was maintained at 70° C. for 2 hours, cooled to room temperature, and filtered through a 200-mesh filter cloth. The resulting emulsion polymer composition had a non-volatile content of 43.0%, a pH of 6.7 and a viscosity of 80 cps. The composition had good storage stability after storage for one month at 50° C. The composition was coated on a glass plate at 25° C. in the same way as in Example 1. The coated film had good toluene resistance.

EXAMPLE 5

The same reactor as in Example 1 was charged with 542 parts of the emulsion polymer obtained in Example 2 as seed particles and 195 parts of deionized water. While nitrogen gas was fed into the reactor, the temperature of the inside of the reactor was maintained at 30° C. with stirring. The following materials were successively added and emulsion polymerization was carried out.

| | | |
|---|---|---|
| A: | AE-1 | 9.0 parts |
| | Deionized water | 13.0 parts |
| B: | 1.0% aqueous solution of $FeCl_3.6H_2O$ | 0.5 part |
| C: | Sodium sulfoxylate formaldehyde | 0.4 part |
| | Deionized water | 19.6 parts |
| D: | Ethyl acrylate | 65.0 parts |
| | Methyl methacrylate | 31.0 parts |
| | Methacrylic acid | 2.0 parts |
| | Dimethylaminoethyl methacrylate | 2.0 parts |
| | Laurylmercaptan | 0.1 part |
| E: | Ammonium persulfate | 0.4 part |
| | Deionized water | 19.6 parts |

Specifically, A, and then B, were added. Five minutes later, C was added, and five minutes later D was added. After the lapse of 15 minutes, E was added. Heat was generated as a result of polymerization, and the temperature of the inside of the reactor reached 70° C. The reaction mixture was maintained at this temperature for 15 minutes, and then cooled to 30° C. F, G and H were then successively added.

| F: | Sodium sulfoxylate formaldehyde | 0.4 part |
|---|---|---|
|  | Deionized water | 19.6 parts |
| G: | Ethyl acrylate | 65.0 parts |
|  | Methyl methacrylate | 31.0 parts |
|  | Methacrylic acid | 2.0 parts |
|  | Dimethylaminoethyl methacrylate | 2.0 parts |
|  | Laurylmercaptan | 0.1 part |
| H: | Ammonium persulfate | 0.4 part |
|  | Deionized water | 19.6 parts |

When F, G and H were added by the same procedure as C, D and E above, heat was generated by polymerization and the temperature of the inside reached 65° C. The mixture was maintained at this temperature for 1 hour, cooled to room temperature, and filtered through a 200-mesh filter cloth to form an emulsion polymer composition.

The resulting composition had a non-volatile content of 45.2%, a pH of 5.7, and a viscosity of 130 cps. When stored at 50° C. for one month, it showed good storage stability. A coated film from the composition showed good solvent resistance in the same toluene rubbing test as in Example 1 with little injury.

EXAMPLES 6-7

An emulsion polymer composition was prepared in the same way as in Example 1 except that vinylpyridine (Example 6) or N-(2-dimethylaminoethyl)acrylamide (Example 7) was used instead of dimethylaminoethyl methacrylate in Example 1. After pH adjustment to 9.5 with aqueous ammonia, the resulting compositions showed good storage stability when stored at 50° C. for one month. Coated films prepared from the compositions showed good toluene resistance in the same toluene rubbing test as in Example 1.

EXAMPLE 8

An emulsion polymer composition was prepared in the same way as in Example 3 except that "Epitan E-340" (an epoxidized urethane resin produced by Dainippon Ink and Chemicals, Inc.) was used instead of "Epiclon 1050". The resulting emulsion polymer composition was tested as in Example 3. A film prepared from the composition of Example 8 showed better toluene resistance and water resistance than a film prepared from the composition having no epoxy resin. The composition of Example 8 showed good storage stability when stored at 50° C. for one month.

EXAMPLE 9

The same reactor as used in Example 1 was charged with the following materials, and while nitrogen gas was fed into the reactor, the temperature was elevated to 80° C. with stirring. The reaction was carried out at this temperature for 45 minutes.

| Deionized water | 352.5 parts |
|---|---|

-continued

| Acrylic acid | 6.0 parts |
|---|---|
| Laurylmercaptan | 0.3 part |
| Ammonium persulfate | 1.5 parts |

Then, the mixtures A and B to be described were added dropwise simultaneously at the above temperature over 60 minutes.

| Mixture A |  |
|---|---|
| n-Butyl acrylate | 45.0 parts |
| Methyl methacrylate | 58.5 parts |
| Methacrylic acid | 1.5 parts |
| "Epichlon 850" | 15.0 parts |
| Mixture B |  |
| tert-Butyl hydroperoxide | 0.6 part |
| Deionized water | 10.0 parts |

The reaction mixture was maintained at the same temperature for 45 minutes, and then mixtures C and D described below were added dropwise simultaneously at the same temperature over 2 hours.

| Mixture C |  |
|---|---|
| n-Butyl acrylate | 84.5 parts |
| Methyl methacrylate | 100.0 parts |
| Methacrylic acid | 1.5 parts |
| Dimethylaminoethyl methacrylate | 3.0 parts |
| Mixture D |  |
| tert-Butyl hydroperoxide | 0.9 part |
| Deionized water | 20.0 parts |

The mixture was maintained further at the same temperature for 2 hours, cooled to room temperature, adjusted to pH 8.0 with aqueous ammonnia, and filtered through a 200-mesh filter cloth to give a soap-free emulsion polymer composition.

The resulting emulsion polymer composition had a non-volatile content of 44.8%, a pH of 8.0 and a viscosity of 40 cps. The composition showed good stability when stored at 50° C. for one month. As in Example 1, a coated film prepared from the composition on a glass plate at 25° C. showed good toluene resistance.

The advantages of this invention are enumerated below.

(1) Since the curing agent and the curing promoter are localized within the emulsion polymer particles, an emulsion having good stability can be obtained.

(2) When by drying the emulsion polymer particles are melted and converted to a film, the film cures even at a low temperature such as room temperature. The cured film has excellent durability characteristics such as solvent resistance and water resistance.

(3) The resulting emulsion polymer composition can be used in various applications as a one-package composition and lends itself to easy handling. There is no need to consider the pot life as in conventional two-package types.

(4) The process of this invention is very easy to carry out industrially since it involves known conventional emulsion polymerization means for obtaining the desired emulsion polymer composition.

We claim:

1. A process for producing an emulsion polymer composition which comprises (a) aqueous emulsion polymerizing at least one ethylenically unsaturated monomer containing no amino group in the molecule in the presence of a water-insoluble epoxy resin having at least two glycidyl groups to form an emulsion polymer as seed particles, and then (b) emulsion-polymerizing an ethylenically unsaturated monomer containing an amino group in the molecule and another ethylenically unsaturated monomer copolymerizable with it in the presence of the emulsion polymer formed in step (a); in which (1) the weight ratio of said at least one ethylenically unsaturated monomer to said epoxy resin in step (a) is from 100:100 to 100:5,
(2) the weight ratio of said amino group-containing ethylenically unsaturated monomer to said another ethylenically unsaturated monomer in step (b) is from 1:99 to 25:75,
(3) said at least one ethylenically unsaturated monomer in step (a) and/or said another ethylenically unsaturated monomer in step (b) contains 1 to 10% by weight of an ethylenically unsaturated carboxylic acid,
(4) the weight ratio of said at least one ethylenically unsaturated monomer in step (a) to said amino group-containing ethylenically unsaturated monomer plus said another ethylenically unsaturated monomer in step (b) is from 10:90 to 90:10,
(5) the weight ratio of the epoxy resin to said at least one ethylenically unsaturated monomer plus said amino group-containing ethylenically unsaturated monomer plus said another ethylenically unsaturated monomer is from 2:100 to 50:100, and
(6) the concentration of said at least one ethylenically unsaturated monomer plus said amino group-containing ethylenically unsaturated monomer plus said another ethylenically unsaturated monomer being such that said final emulsion polymer composition has a solids concentration of 25 to 65% by weight.

2. The process of claim 1 in which the water-insoluble epoxy resin is a reaction produce formed between bisphenol A and epichlorohydrin.

3. The process of claim 1 in which the water-insoluble epoxy resin is an epoxidized urethane resin.

4. The process of claim 1 in which the amino group-containing ethylenically unsaturated monomer is a dialkylaminoethyl acrylate.

5. The process of claim 1 in which the amino group-containing ethylenically unsaturated monomer is a dialkylaminoethyl methacrylate.

6. The process of claim 1 in which the emulsion polymerization in step (a) is carried out in the presence of an emulsifier.

7. The process of claim 1 in which the emulsion polymerization in step (a) is carried out in the absence of an emulsifier.

8. The process of claim 1 in which the emulsion polymerization in step (a) is carried out in the presence of an emulsifier, a water-soluble polymer or a mixture thereof, said water-soluble polymer being selected from the group consisting of acrylic acid polymer, methacrylic acid polymer, maleinized polybutadiene, styrene/maleic acid copolymer, vinylsulfonic acid polymer and sulfoethyl acrylate copolymer, the total amount of emulsifier plus water-soluble polymer being 0.5 to 15% by weight based on the total weight of the water-insoluble epoxy resin and the ethylenically unsaturated monomer is step (a).

* * * * *